United States Patent
Yang et al.

(10) Patent No.: US 10,959,165 B2
(45) Date of Patent: Mar. 23, 2021

(54) MOBILE TERMINAL-BASED NETWORK ACCESS POINT STORAGE PROCESSING METHOD AND MOBILE TERMINAL

(71) Applicant: JRD COMMUNICATION (SHENZHEN) LTD, Guangdong (CN)

(72) Inventors: Weiqin Yang, Guangdong (CN); Bin Yu, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 80 days.

(21) Appl. No.: 16/236,361

(22) Filed: Dec. 29, 2018

(65) Prior Publication Data

US 2019/0141623 A1 May 9, 2019

Related U.S. Application Data

(63) Continuation of application No. PCT/CN2017/094123, filed on Jul. 24, 2017.

(30) Foreign Application Priority Data

Aug. 16, 2016 (CN) .......................... 201610672637.4

(51) Int. Cl.
*H04W 48/16* (2009.01)
*H04W 84/12* (2009.01)

(52) U.S. Cl.
CPC ............ *H04W 48/16* (2013.01); *H04W 84/12* (2013.01)

(58) Field of Classification Search
None
See application file for complete search history.

(56) References Cited

U.S. PATENT DOCUMENTS

| 8,959,235 | B1 | 2/2015 | Newstadt et al. |
| 2008/0198811 | A1* | 8/2008 | Deshpande ........... H04W 48/16 370/332 |
| 2009/0245176 | A1* | 10/2009 | Balasubramanian ........ H04W 48/20 370/328 |
| 2011/0087747 | A1* | 4/2011 | Hirst ................... H04M 1/2748 709/206 |
| 2013/0339383 | A1* | 12/2013 | Song ................... G06F 16/9537 707/769 |

(Continued)

FOREIGN PATENT DOCUMENTS

| CN | 104582000 A | 4/2015 |
| CN | 105163400 A | 12/2015 |

*Primary Examiner* — Andrew C Oh

(57) ABSTRACT

The disclosure discloses mobile terminal-based network access point storage processing method and mobile terminal. The mobile terminal-based network access point storage processing method may include actions: presetting periodic cleaning time for periodically cleaning network access points and screening time for filtering out long-term idle network access points; acquiring latest connection time when the mobile terminal is connected to one of the network access points, and storing the latest connection time and access point information for identifying the one of the network access points; traversing the latest connection time of every one of the network access points after the periodic cleaning time is reached, and filtering out the long-term idle network access points according to the screening time; cleaning the long-term idle network access points.

8 Claims, 7 Drawing Sheets

(56) References Cited

U.S. PATENT DOCUMENTS

| | | | |
|---|---|---|---|
| 2014/0185604 A1* | 7/2014 | Kil | H04W 48/20 370/338 |
| 2014/0293829 A1* | 10/2014 | Visuri | H04M 15/8351 370/254 |
| 2015/0065128 A1* | 3/2015 | Hara | H04W 48/20 455/434 |
| 2016/0063275 A1 | 3/2016 | Cho et al. | |
| 2016/0219520 A1* | 7/2016 | Hara | H04W 52/0225 |
| 2017/0026850 A1* | 1/2017 | Smith | H04W 4/025 |
| 2017/0127373 A1* | 5/2017 | Deshpande | H04W 64/00 |
| 2017/0142650 A1* | 5/2017 | Wang | H04W 48/20 |
| 2017/0201852 A1* | 7/2017 | Kuang | H04L 63/083 |
| 2017/0272911 A1* | 9/2017 | Agrawal | H04L 61/6022 |

\* cited by examiner

MOBILE TERMINAL-BASED NETWORK ACCESS POINT STORAGE PROCESSING METHOD AND MOBILE TERMINAL

CROSS REFERENCE TO RELATED APPLICATIONS

The present application is a continuation-application of International (PCT) Patent Application No. PCT/CN2017/094123 filed on Jul. 24, 2017, which claims foreign priority of Chinese Patent Application No. 201610672637.4, filed on Aug. 16, 2016 in the National Intellectual Property Administration of China, the entire contents of which are hereby incorporated by reference.

TECHNICAL FIELD

The present disclosure relates to the field of mobile terminals, and in particular to a mobile terminal-based network access point storage processing method and a mobile terminal.

BACKGROUND

With the advancement of technology, the network connection performance of mobile terminals has become an important indicator to measure the performance of mobile terminals.

Wireless networks in the category of wireless local area networks refer to "wireless compatibility certification". It is essentially a commercial certification, and it is also a wireless networking technology. Previously, it was connected to the network through a network cable, and wireless fidelity was connected by radio waves. More common is the wireless router. The wireless coverage of the wireless router can be wirelessly connected using a wireless fidelity connection. If the wireless router is connected to an ADSL line or another Internet line, it is also called a hotspot.

Most mobile terminals at present automatically search for nearby wireless networks and automatically record and connect to the wireless network that the mobile terminal has connected to. Undoubtedly, this function greatly improves the intelligence and ease of use of the mobile terminal, but at the same time, it also brings some problems to the mobile terminal. For example, a large number of "one-time" wireless network access points stored in a mobile terminal, that is, network access points that are not used once only once, cause a large amount of redundant information.

Therefore, the prior art has yet to be improved and developed.

SUMMARY

In view of the above shortcomings of the prior art, an object of the present disclosure is to provide mobile terminal-based network access point storage processing method and mobile terminal can clean a network access point that can be automatically selected by the mobile terminal at a time to reduce redundant information in the mobile terminal and improve the running speed of the mobile terminal. The technical solution of the present disclosure is as follows:

A mobile terminal-based network access point storage processing method, may include:

block A, presetting periodic cleaning time for periodically cleaning network access points and screening time for filtering out long-term idle network access points;

block B, acquiring latest connection time when the mobile terminal is connected to one of the network access points, and storing the latest connection time and access point information for identifying the one of the network access points;

block C, acquiring current time when the periodic cleaning time is reached; traversing all the network access points, and acquiring the latest connection time corresponding to every one of the network access points; calculating idle time of the every one of the network access points according to the current time and the latest connection time; comparing the idle time with the screening time and listing a portion of the network access points corresponding to the idle time thereof larger than the screening time as the long-term idle network access points; and block D, arranging all the long-term idle network access points in a row to display and deleting all the long-term idle network access points one by one or at the same time.

A mobile terminal-based network access point storage processing method may include:

block A, presetting periodic cleaning time for periodically cleaning network access points and screening time for filtering out long-term idle network access points;

block B, acquiring latest connection time when the mobile terminal is connected to one of the network access points, and storing the latest connection time and access point information for identifying the one of the network access points;

block C, traversing the latest connection time of every one of the network access points after the periodic cleaning time is reached, and filtering out the long-term idle network access points according to the screening time; and Block D, cleaning the long-term idle network access points.

A mobile terminal may include a communication bus, a processor and a storage connected to the processor through the communication bus.

a program data is stored in the storage, the program data is utilized by the processor to:

block A, preset periodic cleaning time for periodically cleaning network access points and screening time for filtering out long-term idle network access points;

block B, acquire latest connection time when the mobile terminal is connected to one of the network access points, and storing the latest connection time and access point information for identifying the one of the network access points;

block C, traverse the latest connection time of every one of the network access points after the periodic cleaning time is reached, and filter out the long-term idle network access points according to the screening time; and block D, clean the long-term idle network access points.

DETAILED DESCRIPTION

In order to more clearly illustrate embodiments of the disclosure or prior art, following figures described in embodiments or prior art will be briefly introduced, it is obvious that the drawings are merely some embodiments of the disclosure, a person skilled in the art can obtain other figures according to these figures without creativity.

In the embodiment of the present disclosure, the network access point refers to a wireless network access point, preferably a Wi-Fi access point.

Figure 1:
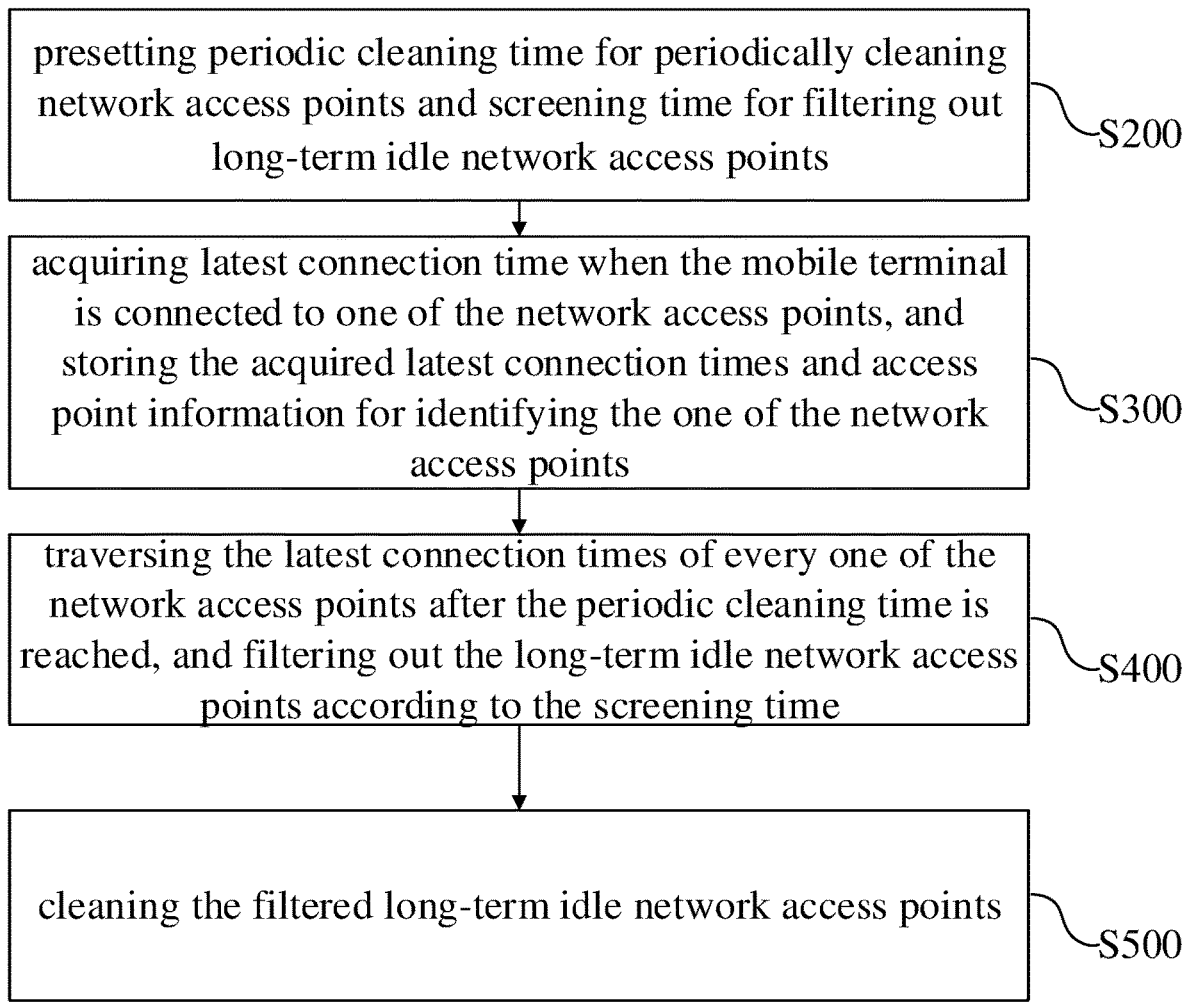
FIG. 1 is a schematic flow chart of an embodiment of a mobile terminal-based network access point storage processing method of the present disclosure.

As shown in FIG. 1, the present disclosure provides a mobile terminal-based network access point storage processing method, which may include the following actions at bocks S200 to S500.

S200: presetting periodic cleaning time for periodically cleaning network access points and screening time for filtering out long-term idle network access points; this block specifically includes the following actions at bocks S210 to S220.

S210: presetting the periodic cleaning time for periodically cleaning network access points; and S220: presetting the screening time for filtering out the long-term idle network access points.

The order of blocks S210 and S220 can be adjusted.

The periodic cleaning time may be calculated from the time when the periodic cleaning time is set or a set time.

In some embodiments, it can be assumed that the periodic cleaning time is N, the unit is day, the screening time is M, and the unit is day. In order to ensure that the network access point can be cleaned up periodically without omission, the screening time M can be greater than or equal to the periodic cleaning time N.

S300: acquiring latest connection time when the mobile terminal is connected to one of the network access points, and storing the acquired latest connection times and access point information for identifying the one of the network access points.

The latest connection time refers to the time when the mobile terminal is connected to a network access point. Since the mobile terminal may have been connected to the network access point, in order to distinguish the connection time from the previous connection time, the last connection time can referred to as the latest connection time, and then described in a progressively increasing manner. If the last connection is the Xth time, the Xth connection time can be the latest connection time, and the X−1th time can be the second connection time, the X−2th time can be the third connection time, and the like.

The access point information may include information for identifying a network access point and information for being connected to the network access point. It may include, for example, an access point name, an access point proxy, an access point port, a password, a server, an authentication type, and the like, which can be automatically acquired when the mobile terminal is connected to the network access point, and is a prior art.

When the access point information of a network access point and the latest connection time is stored, the stored information may be arranged according to certain rules, and the specific settings may be performed according to actual needs.

In some embodiments, the latest connection time and the access point information can be stored in the Wi-Fi module, and the Wi-Fi module can originally have the function of storing part of the access point information. Therefore, the latest connection time and the information which may be not included in the original Wi-Fi module can be attached to the original Wi-Fi module according to certain rules during storage. In some embodiments, a storage file that can be dedicated to storing the latest connection time and access point information can be created.

S400: traversing the latest connection times of every one of the network access points after the periodic cleaning time is reached, and filtering out the long-term idle network access points according to the screening time.

In some embodiments, after the periodic cleaning time is reached, the current time may be acquired through the operating system interface, and the screening time may be subtracted from the current time to acquire a judgment time. The storage area with the latest connection time and the access point information of the network access point may be searched, and the judgment time may be compared with the searched latest connection time, the network access point corresponding to the latest connection time before the judgment time or at the judgment time may be classified as a long-term idle network access point, and the network access point corresponding to the latest connection time after the judgment time may be classified as a non-long-term idle network access point.

In some embodiments, when the periodic cleaning time is preset, the specific time for periodical cleaning each time can be directly set. If the time for setting the periodic cleaning is A, and one-time cleaning is performed every B days, the time A+B, A+2B, . . . , A+NB for periodic cleaning can be directly set. After the preset time is reached, the current time can be first acquired through the operating system interface, and then the latest connection time of all saved network access points may be searched, and the latest connection time which has been searched is subtracted one by one by the acquired current time. All the calculated results may be compared with the screening time one by one, and the network access points corresponding to the calculation results which are greater than or equal to the screening time can be classified as long-term idle network access points, and the network access points corresponding to the calculation results which are less than the screening time can be classified as non-long-term idle network access points.

S500: cleaning the filtered long-term idle network access points.

In some embodiments, all the long-term idle network access points may be arranged in a list to display, and the access point information in the corresponding Wi-Fi module can be deleted. The operating system interface can be called to delete the information corresponding to the access point information and latest connection time of the storage network access point.

In the mobile terminal-based network access point storage processing method provided by the present disclosure, since the preset periodical cleaning time for periodically cleaning the network access points and the screening time for filtering out the long-term idle network access points may be adopted, then the latest connection time when the mobile terminal is connected to the network access point may be acquired. The latest connection time acquired and the access point information for identifying the network access point may be acquired. The long-term idle network access points according to the stored latest connection time and screening time may be cleaned up after the preset periodic cleaning time is reached. The mobile terminal can automatically select a network access point that is not used for a long time to be cleaned at interval to reduce redundant information in the mobile terminal and improve the running speed of the mobile terminal. The latest connection time can be updated when the network access point is connected to the mobile terminal each time to improve the accuracy of network access point cleaning.

Figure 2:
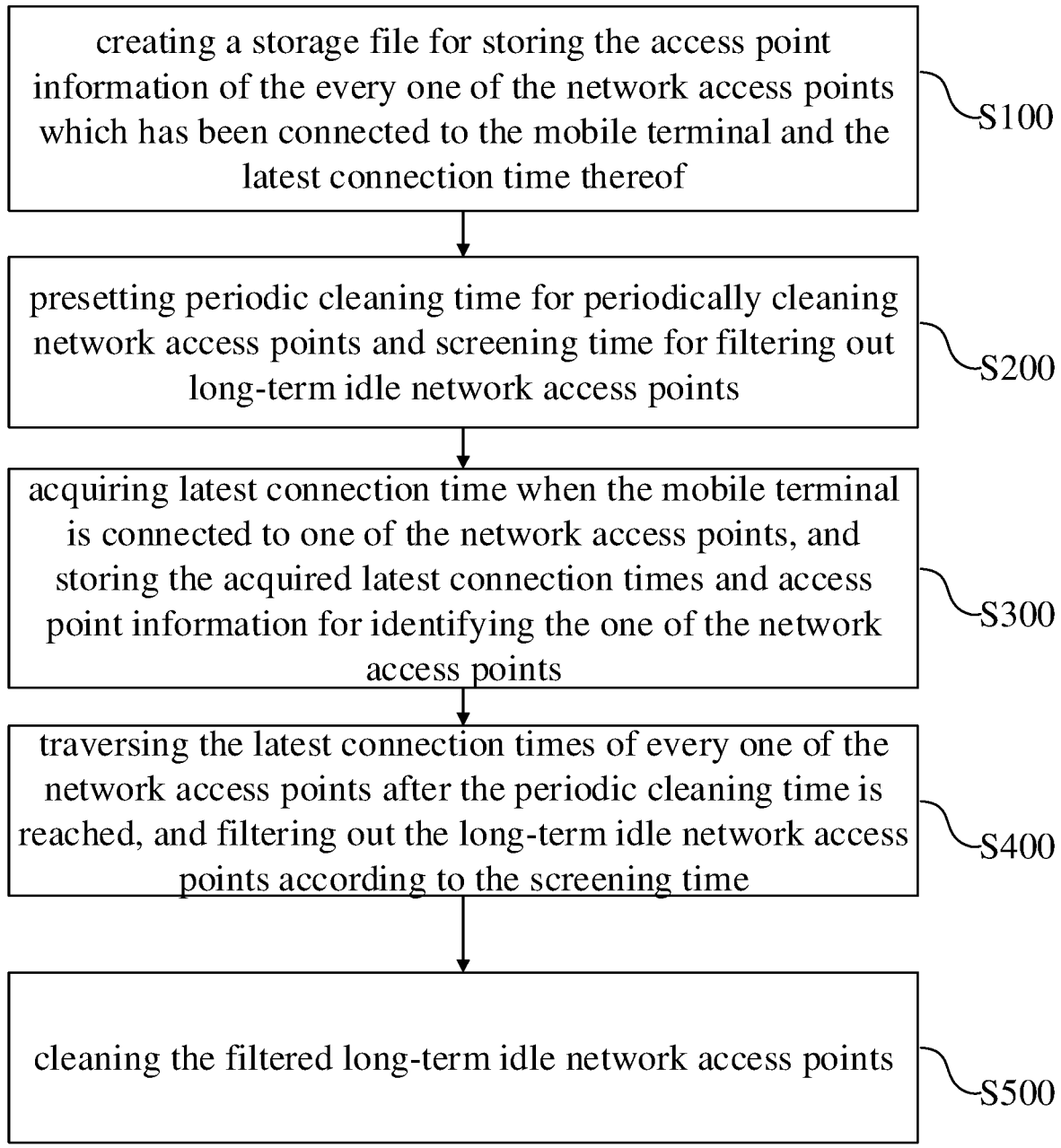
FIG. 2 is a schematic flow chart of another embodiment of a mobile terminal-based network access point storage processing method of the present disclosure.

As shown in FIG. 2, the mobile terminal-based network access point storage processing method may further include the following actions at bock S100.

S100: creating a storage file for storing the access point information of the every one of the network access points which has been connected to the mobile terminal and the latest connection time thereof.

The information required to be stored of all currently available network access points can be stored in a specified file, that is the storage file which may facilitate management of the network access points and cleaning of the long-term idle network access points.

Figure 3:
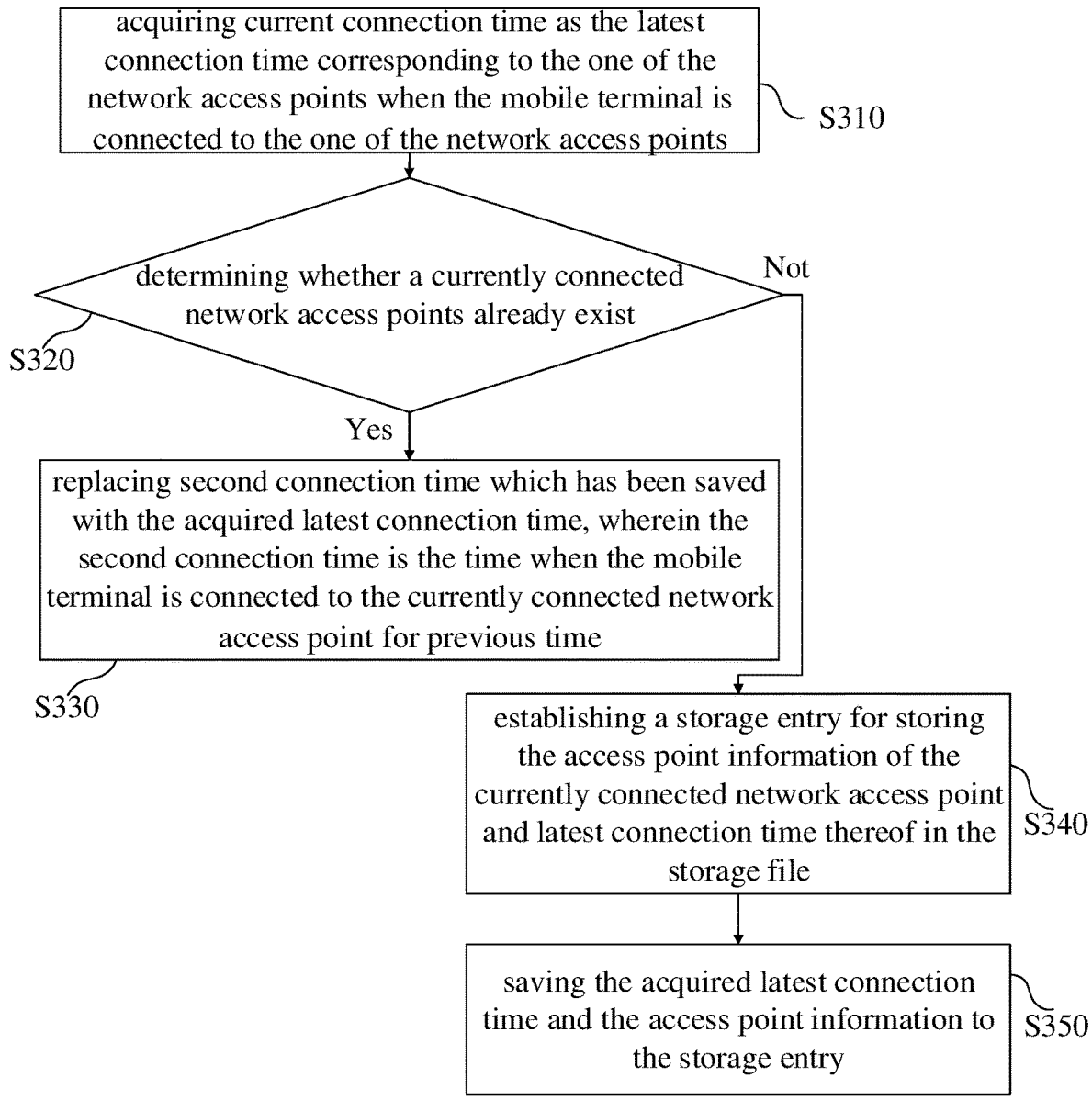
FIG. 3 is a schematic flowchart of block S300 in a mobile terminal-based network access point storage processing method of the present disclosure.

In some embodiments, as shown in FIG. 3, the S300 may specifically include the following actions at bocks S310 to S350.

block 310: acquiring current connection time as the latest connection time corresponding to one of the network access points when the mobile terminal is connected to the one of the network access points.

The current connection time is acquired through the operating system interface of the mobile terminal.

S320: traversing all the stored network access points, determining whether a currently connected network access point already exist, if yes, executing block S330, if not, executing block S340.

In order to further reduce redundant information, it can be set to automatically search whether the connection information of the network access point is stored in the mobile terminal whenever the mobile terminal is connected to the network access point. If there is, then time coverage or time refresh is performed to update the latest connection time, otherwise the new save entry can be established and saved.

S330: replacing second connection time which has been saved with the acquired latest connection time, wherein the second connection time is the time when the mobile terminal is connected to the currently connected network access point for previous time.

By means of replacement mode, the latest connection time can be updated to greatly reduce the redundant information stored in the mobile terminal, release the memory of the mobile terminal, and prolong the service life of the mobile terminal.

S340: establishing a storage entry for storing the access point information of the currently connected network access point and latest connection time thereof in the storage file.

In some embodiments, when the mobile terminal is connected to a new network access point each time, a storage entry can be established for storing the access point information and the latest connection time of the new network access point according to a certain rule, thereby improving the management convenience of the network access points.

S350: saving the acquired latest connection time and the access point information to the storage entry.

Figure 4:
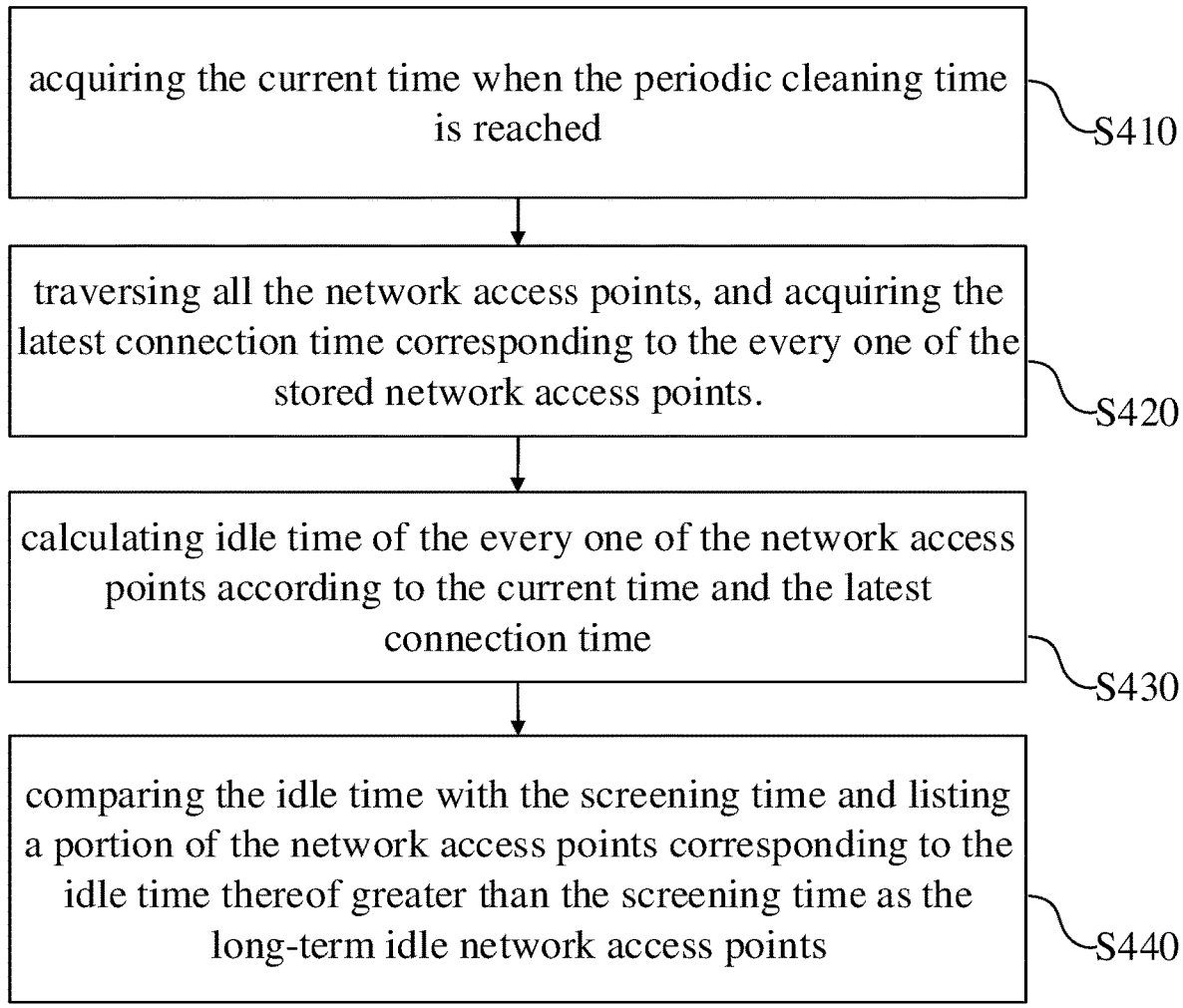
FIG. 4 is a schematic flowchart of block S400 in a mobile terminal-based network access point storage processing method of the present disclosure.

In some embodiments, referring to FIG. 4, the S400 may specifically include the following actions at blocks S410 to S440.

S410: acquiring the current time when the preset periodic cleaning time is reached.

In some embodiments, the current time is acquired by calling the operating system interface of the mobile terminal, such as reading the "acquisition system time" under the control of the system through the program interface of the mobile terminal operating system. The program interface can include a set of system call commands, the set of system call commands can be provided to be used by the user program. The command to acquire the system time can be "time".

The acquired current time can be used on the one hand to calculate the idle time of each of the stored network access points and on the other hand to calculate the next periodic cleaning time.

The acquiring the current time in the block and the acquiring the current time in the S310 may be performed by the same unit or may be performed by different units; that is, the first time acquiring unit and the second time acquiring unit may be the same unit or different units.

S420: traversing all the network access points, and acquiring the latest connection time corresponding to the every one of the stored network access points.

In this block, the latest connection time of the every one of the network access points may be searched and calculated one by one or may be calculated one by one after all the searches are completed.

S430: calculating idle time of the every one of the network access points according to the current time and the latest connection time.

That is, the latest connection time acquired can be subtracted from the acquired current time, and the acquired value is the idle time of the network access point, and the every one of the stored network access points corresponds to an idle time.

S440: comparing the idle time with the screening time and listing a portion of the network access points corresponding to the idle time thereof greater than the screening time as the long-term idle network access points.

Figure 5:
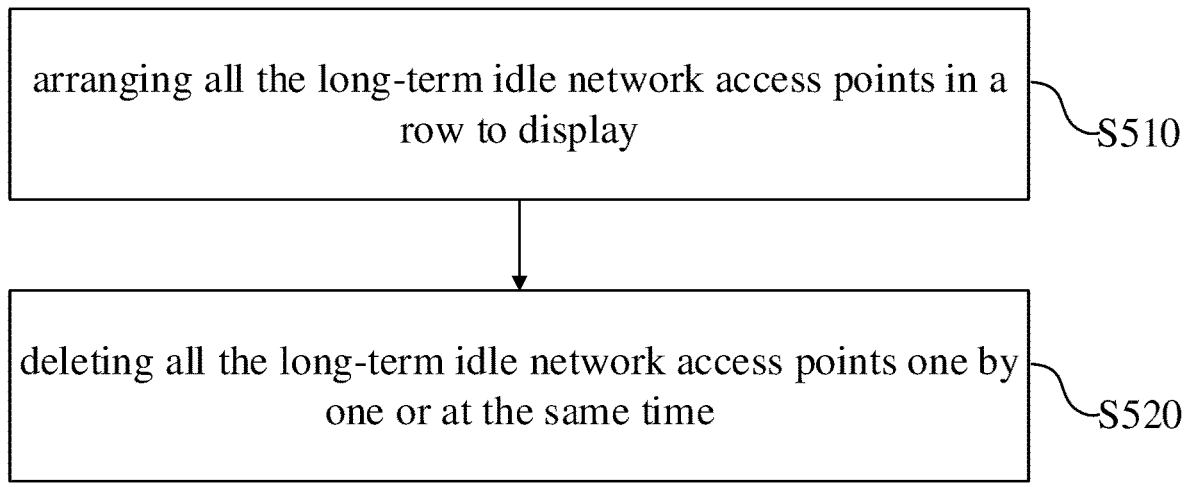
FIG. 5 is a schematic flowchart of block S500 in a mobile terminal-based network access point storage processing method of the present disclosure.

In some embodiments, referring to FIG. 5, the block S500 specifically includes the following actions at blocks S510 to S520.

S510: arranging all the long-term idle network access points in a row to display.

The arrangement in this block may be displayed on the display screen in the form of a list or may be displayed on the central processing unit in the form of a list to facilitate further processing by the central processing unit.

S520: deleting all the long-term idle network access points one by one or at the same time.

Deleting all long-term idle network access points may include deleting the access point name in the Wi-Fi module corresponding to the long-term idle network access point, and all the information in the entry corresponding to the long-term idle network access point stored in the storage file, such as the latest connection time, access point information, and so on.

Figure 6:
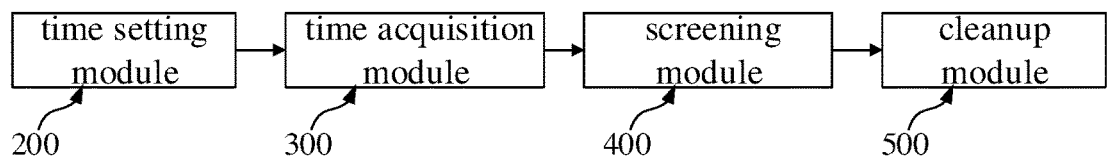
FIG. 6 is a functional block diagram of an embodiment of the mobile terminal-based network access point storage processing system of the present disclosure.

As shown in FIG. 6, the present disclosure further provides a network access point storage processing system based on a mobile terminal, where the mobile terminal-based network access point storage processing system may include a time setting module 200, a time acquisition module 300, a screening module 400 and a cleanup module 500.

The time setting module 200 may be configured to preset periodic cleaning time for periodically cleaning network access points and screening time for filtering out long-term idle network access points.

The time acquisition module 300 may be configured to acquire latest connection time when the mobile terminal is connected to one of the network access points, and store the latest connection time and access point information used to identify the one of the network access points.

The screening module 400 may be configured to traverse the latest connection time of every one of the network access points after the periodic cleaning time is reached, and filter out the long-term idle network access points according to the screening time.

The cleanup module 500 may be configured to clean up the long-term idle network access points that are filtered out.

The above modules can be specifically as described in the above method embodiment.

Figure 7:
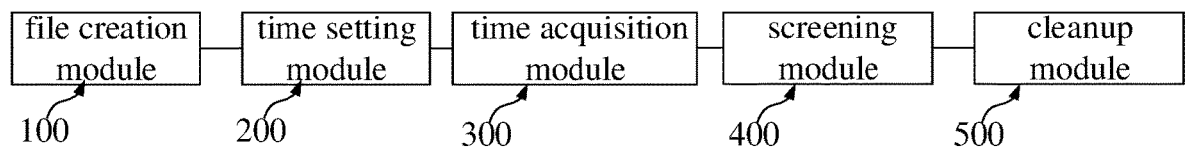
FIG. 7 is a functional block diagram of another embodiment of the mobile terminal-based network access point storage processing system of the present disclosure.

As shown in FIG. 7, the mobile terminal-based network access point storage processing system may further include a file creation module 100.

The file creation module 100 may be configured to create a storage file for storing the access point information of the every one of the network access points which has been connected to the mobile terminal and the latest connection time thereof.

Figure 8:
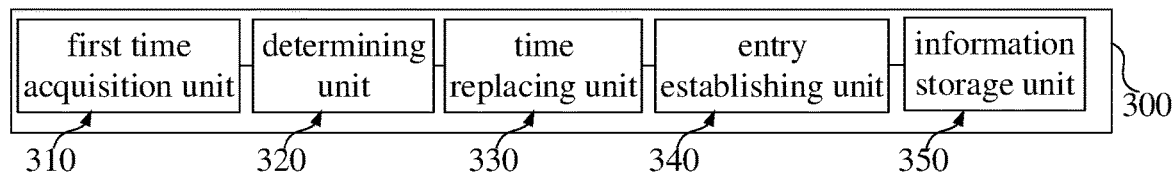
FIG. 8 is a functional block diagram of the time acquisition module of the mobile terminal-based network access point storage processing system of the present disclosure.

In some embodiments, referring to FIG. 8, the time acquisition module 300 may specifically include a first time acquisition unit 310, a determining unit 320, a time replacing unit 330, an entry establishing unit 340 and an information storage unit 350.

The first time acquisition unit 310 may be configured to acquire the current connection time as the latest connection time corresponding to the one of the network access points when the mobile terminal is connected to the one of the network access points.

The determining unit 320 may be configured to traverse all the network access points, determine whether a currently connected network access point already exists.

The time replacing unit 330 may be configured to replace second connection time which has been saved with the acquired latest connection time when a determination result of the determining unit 320 is yes, wherein the second connection time is the time when the mobile terminal is connected to the currently connected network access point for previous time.

The entry establishing unit 340 may be configured to establish a storage entry for storing access point information of the currently connected network access point and latest connection times thereof in the created storage file when the determination result of the determining unit 320 is not; and The information storage unit 350 may be configured to save the latest connection time and the access point information to the storage entry.

The time acquisition module 300 of the present embodiment can be specifically as described in the above method embodiment.

Figure 9:
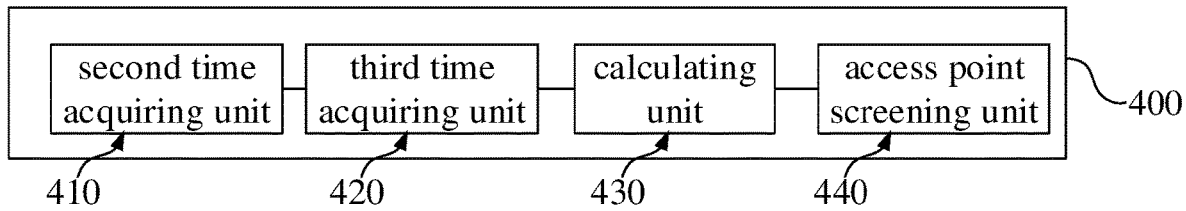
FIG. 9 is a functional block diagram of the screening module of the mobile terminal-based network access point storage processing system of the present disclosure.

In some embodiments, referring to FIG. 9, the screening module 400 may specifically include a second time acquiring unit 410, a third time acquiring unit 420, a calculating unit 430 and an access point screening unit 440.

The second time acquiring unit 410 may be configured to acquire the current time when the periodic cleaning time is reached.

The third time acquiring unit 420 may be configured to traverse the stored network access points, and acquire the latest connection time corresponding to the every one of the network access points.

The calculating unit 430 may be configured to calculate idle time of the every one of the stored network access points according to the current time and the latest connection time.

The access point screening unit 440 may be configured to compare the idle time with the screening time and list a portion of the network access points corresponding to the idle time thereof larger than the screening time as the long-term idle network access points.

The screening module 400 of present embodiment can be specifically as described in the above method embodiment.

Figure 10:
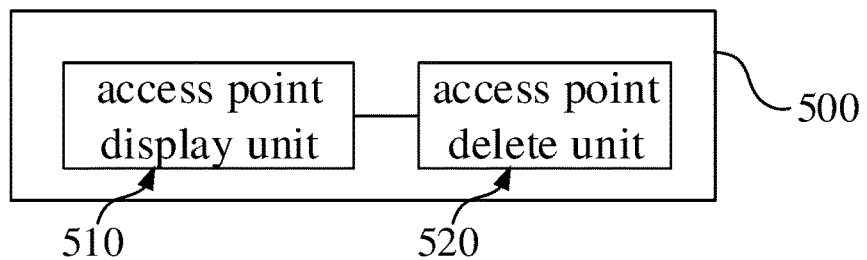
FIG. 10 is a functional block diagram of the cleanup module of the mobile terminal-based network access point storage processing system of the present disclosure.

Referring to FIG. 10, in some embodiments, the cleanup module 500 may specifically include an access point display unit 510 and an access point delete unit 520.

The access point display unit 510 may be configured to arrange all the long-term idle network access points in a row to display.

The access point delete unit 520 may be configured to delete all the long-term idle network access points one by one or at the same time.

The cleanup module 500 of present embodiment can be specifically as described in the above method embodiment.

Figure 11:
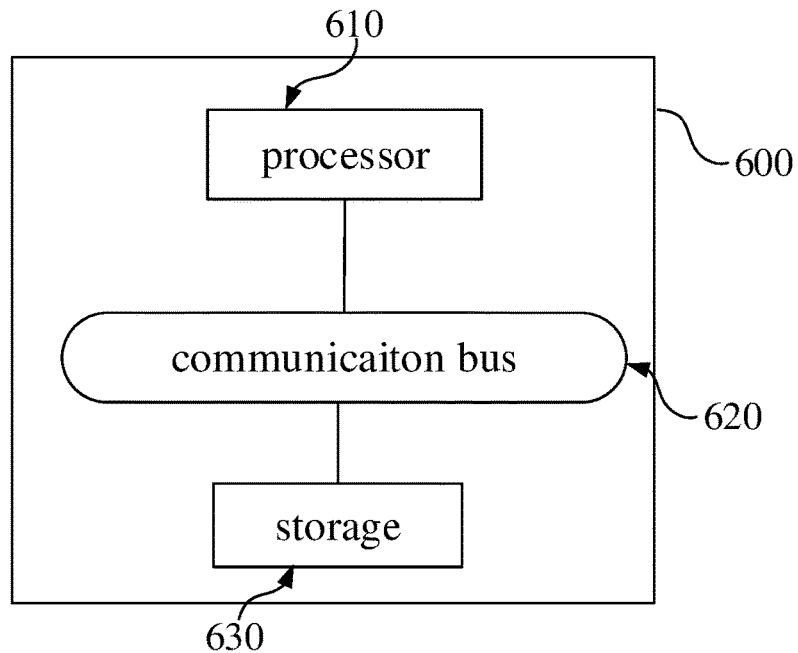
FIG. 11 is a schematic diagram of a mobile terminal of the present disclosure.

Referring to FIG. 11, the mobile terminal 600 of the present disclosure may include a processor 610, a communication bus 620 and a storage 630 connected to the processor 610 thorough the communication bus 620. A program data can be stored in the storage, and utilized by processor to executed blocks described in above embodiments of the present disclosure.

The above description merely depicts some exemplary embodiments of the present disclosure, but is intended to limit the scope of the present disclosure. It should be understood that any equivalent structural variations or equivalent process flow variations of the described embodiments and the accompanying drawings, or direct or indirect applications of the described embodiments and the accompanying drawings in other relevant technical fields, shall all be covered within the scope of protection of the present disclosure.

What is claimed is:

1. A mobile terminal-based network access point storage processing method, comprising:
   block A, presetting periodic cleaning time for periodically cleaning network access points and screening time for filtering out long-term idle network access points;
   block B, acquiring latest connection time when the mobile terminal is connected to one of the network access points, and storing the latest connection time and access point information for identifying the one of the network access points;
   block C, traversing the latest connection time of every one of the network access points after the periodic cleaning time is reached, and filtering out the long-term idle network access points according to the screening time, wherein the block C specifically comprises:
   block C1, acquiring the current time when the periodic cleaning time is reached;

block C2, traversing all the network access points, and acquiring the latest connection time corresponding to the every one of the network access points;

block C3, calculating idle time of the every one of the network access points according to the current time and the latest connection time; and block C4, comparing the idle time with the screening time and listing a portion of the network access points corresponding to the idle time thereof larger than the screening time as the long-term idle network access points; and Block D, cleaning the long-term idle network access points.

2. The mobile terminal-based network access point storage processing method according to claim 1, wherein, before block A, comprising:

block S, creating a storage file for storing the access point information of the every one of the network access points which has been connected to the mobile terminal and the latest connection time thereof.

3. The mobile terminal-based network access point storage processing method according to claim 2, wherein the block B specifically comprises:

block B1, acquiring current connection time as the latest connection time corresponding to the one of the network access points when the mobile terminal is connected to the one of the network access points;

block B2, traversing all the network access points, determining whether a currently connected network access point already exists, if yes, executing block B3, if not, executing block B4;

block B3, replacing second connection time which has been saved with the latest connection time, wherein the second connection time is the time when the mobile terminal is connected to the currently connected network access point for previous time;

block B4, establishing a storage entry for storing the access point information of the currently connected network access point and latest connection time thereof in the storage file; and block B5, saving the latest connection time and the access point information to the storage entry.

4. The mobile terminal-based network access point storage processing method according to claim 1, wherein the block D specifically comprises:

block D1, arranging all the long-term idle network access points in a row to display; and block D2, deleting all the long-term idle network access points one by one or at the same time.

5. A mobile terminal, comprising:
a communication bus;
a processor;
a storage connected to the processor through the communication bus;
wherein a program data is stored in the storage and utilized by the processor, so that the processor is configured to:
block A, preset periodic cleaning time for periodically cleaning network access points and screening time for filtering out long-term idle network access points;

block B, acquire latest connection time when the mobile terminal is connected to one of the network access points, and storing the latest connection time and access point information for identifying the one of the network access points;

block C, traverse the latest connection time of every one of the network access points after the periodic cleaning time is reached, and filter out the long-term idle network access points according to the screening time; and block D, clean the long-term idle network access points;

wherein the processor is further configured to:
block C1, acquire the current time when the periodic cleaning time is reached;

block C2, traverse all the network access points, and acquire the latest connection time corresponding to the every one of the network access points;

block C3, calculate idle time of the every one of the network access points according to the current time and the latest connection time; and block C4, compare the idle time with the screening time and listing a portion of the network access points corresponding to the idle time thereof larger than the screening time as the long-term idle network access points.

6. The mobile terminal according to claim 5, wherein, before block A, the processor is further configured to:

block S, create a storage file for storing the access point information of the every one of the network access points which has been connected to the mobile terminal and the latest connection time thereof.

7. The mobile terminal according to claim 6, wherein the processor is further configured to:

block B 1, acquire current connection time as the latest connection time corresponding to the one of the network access points when the mobile terminal is connected to the one of the network access points;

block B2, traverse all the network access points, determining whether a currently connected network access point already exist, if yes, execute block B3, if not, execute block B4;

block B3, replace second connection time which has been saved with the latest connection time, wherein the second connection time is the time when the mobile terminal is connected to the currently connected network access point for previous time;

block B4, establish a storage entry for storing the access point information of the currently connected network access point and latest connection time thereof in the storage file; and block B5, save the latest connection time and the access point information to the storage entry.

8. The mobile terminal according to claim 5, wherein the processor is configured to:

block D1, arrange all the long-term idle network access points in a row to display; and block D2, delete all the long-term idle network access points one by one or at the same time.

* * * * *